US012632008B2

(12) United States Patent
Odeh et al.

(10) Patent No.: US 12,632,008 B2
(45) Date of Patent: May 19, 2026

(54) METHOD FOR MANUFACTURING A TIMEPIECE HAND WITH A CIRCULAR CROSS-SECTION

(71) Applicant: The Swatch Group Research and Development Ltd, Marin (CH)

(72) Inventors: Ahmad Odeh, Renens (CH); Simon Springer, Berne (CH); Gérard Rossier, La Chaux-de-Fonds (CH); Gilles Vuilleumier, Pieterlen (CH)

(73) Assignee: The Swatch Group Research and Development Ltd, Marin (CH)

( * ) Notice: Subject to any disclaimer, the term of this patent is extended or adjusted under 35 U.S.C. 154(b) by 406 days.

(21) Appl. No.: 18/333,001

(22) Filed: Jun. 12, 2023

(65) Prior Publication Data

US 2023/0418228 A1      Dec. 28, 2023

(30) Foreign Application Priority Data

Jun. 28, 2022    (EP) ..................................... 22181575
Sep. 30, 2022    (EP) ..................................... 22199247

(51) Int. Cl.
*G04B 19/04*          (2006.01)
*B23K 26/38*          (2014.01)

(52) U.S. Cl.
CPC ............ *G04B 19/042* (2013.01); *B23K 26/38* (2013.01)

(58) Field of Classification Search
CPC .... G04B 19/04; G04B 19/042; G04D 3/0046; G04D 3/0069; G04D 3/0272; B23K 26/38
See application file for complete search history.

(56) References Cited

U.S. PATENT DOCUMENTS 11,016,444  B2    5/2021   Inoue et al.
2003/0099160  A1   5/2003   Ueno et al.
(Continued)

FOREIGN PATENT DOCUMENTS

CH          710 007 A2      2/2016
CH          716 584 A2      5/2021
(Continued)

OTHER PUBLICATIONS

European Search Report for EP 22 19 9247, dated May 12, 2023.

*Primary Examiner* — Moshe Wilensky
(74) *Attorney, Agent, or Firm* — Sughrue Mion, PLLC

(57)          ABSTRACT

A timepiece hand and method for manufacturing same, including: obtaining a single-piece part, the part extending along a longitudinal axis; rotating the single-piece part; emitting a first modulation of the laser light; exposing a first portion of the single-piece part to the first modulation of the laser light to form a first volume with a circular cross-section with a length $L_1$ and with a mean diameter $D_1$, the ratio $$\frac{L_1}{D_1}$$

being less than or equal to 20 or 10; emitting a second modulation of the laser light; and exposing a second portion of the single-piece part to the second modulation of the laser light, to form a second volume with a circular cross-section with a length $L_2$ and with a mean diameter $D_2$, the ratio $$\frac{L_2}{D_2}$$

being less than or equal to 10.

14 Claims, 2 Drawing Sheets

(56)　　　　　　References Cited

U.S. PATENT DOCUMENTS

| | | |
|---|---|---|
| 2020/0201260 A1 | 6/2020 | Rodriguez et al. |
| 2021/0139738 A1 | 5/2021 | Issartel et al. |

FOREIGN PATENT DOCUMENTS

| | | | |
|---|---|---|---|
| CH | 717 145 | A2 | 8/2021 |
| CN | 204178139 | U | 2/2015 |
| EP | 3 862 819 | A1 | 8/2021 |
| FR | 1 553 021 | A | 1/1969 |
| JP | 50-128068 | U | 10/1975 |
| JP | 2020-101534 | A | 7/2020 |
| JP | 2021-75713 | A | 5/2021 |
| WO | 2021/205030 | A1 | 10/2021 |

Fig. 4
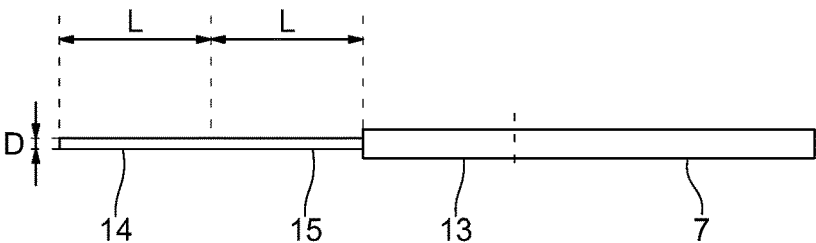
Fig. 5
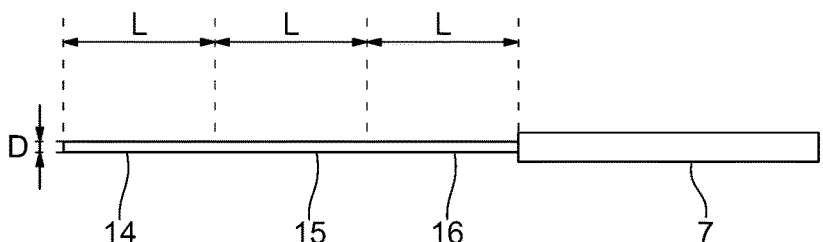
Fig. 6
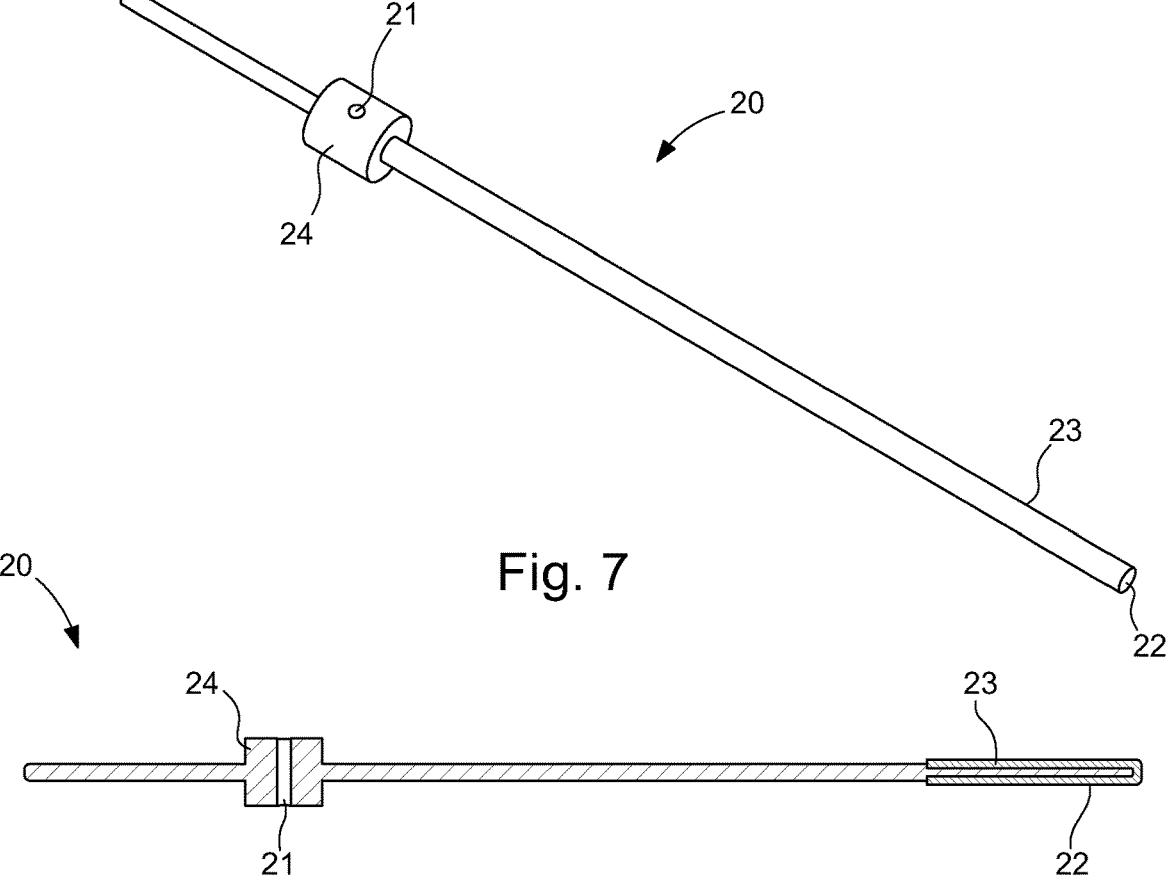
Fig. 7

METHOD FOR MANUFACTURING A TIMEPIECE HAND WITH A CIRCULAR CROSS-SECTION

CROSS REFERENCE TO RELATED APPLICATIONS

This application claims priority to European Patent Application No. 22181575.6 filed Jun. 28, 2022 and European Patent Application No. 22199247.2 filed Sep. 30, 2022, the entire contents of which are incorporated herein by reference.

TECHNICAL FIELD OF THE INVENTION

The field of the invention relates to that of manufacturing methods for timepieces, in particular of a timepiece hand with a circular cross-section

Technological Background

Hands are generally flat with two dimensions, and are obtained by a method for manufacturing hands normally consisting in cutting a metal sheet.

In order to assemble them on the movement, a hole is formed in the hands, in order then to be fitted on a rod passing through the dial. At the present time, laser methods can be used for cropping the sheets.

This manufacturing method is easy to implement, but is limited to producing two-dimensional hands. For aesthetic reasons, if it is wished to obtain a form of the hand with a circular cross-section, this method cannot be used. Circular cross-section means in particular a hand with a rotatory geometry.

To form timepiece-movement shafts or pivots, there are laser turning methods, consisting in rotating a single-piece body to machine it and crop it with the laser beam. The body is held by a machine, which rotates it at a predefined speed, while the laser beam is applied to the periphery of the body to cut it. In this way a part with a circular cross-section, for example cylindrical or conical, is obtained.

However, such a method cannot be used as it stands to form hands with a circular cross-section, since geometric defects appear on the hand. This is because, as the hands are thin and long, the turning operation may vibrate or shift the body, so that the laser machining loses in precision for obtaining a hand with a circular cross-section.

SUMMARY OF THE INVENTION

The present invention sets out to solve all or some of these drawbacks by means of a hand manufactured according to a method for manufacturing a single-piece timepiece hand by laser light.

Said method is remarkable in that it comprises:
- a first step consisting in obtaining a single-piece part made from predefined material, the part extending along a longitudinal axis;
- a second step consisting in rotating said single-piece part:
- a third step consisting in emitting a first modulation of said laser light, for example in power, and/or in geometry, and/or in time;
- a fourth step consisting in exposing a first portion of said single-piece part to said first modulation of said laser light so as to form least a first volume with a circular cross-section, for example cylindrical or conical, with a length $L_1$ and with a mean diameter $D_1$, the ratio $$\frac{L_1}{D_1}$$

being less than or equal to 10, or even less than or equal to 5;
- a fifth step consisting in emitting a second modulation of said laser light, for example in power, and/or in geometry, and/or in time;
- a sixth step consisting in exposing a second portion of said at least one single-piece part to said second modulation of said laser light, so as to form at least a second volume with a circular cross-section, for example cylindrical or conical, with a length $L_2$ and with a mean diameter $D_2$, the ratio $$\frac{L_2}{D_2}$$

being less than or equal to 10, or even less than or equal to 5.

By means of this method, it is possible to manufacture three-dimensional hands with a circular cross-section, which are in particular cylindrical or conical. This is because, firstly, by means of the rotary machining, a form of the hand with a circular cross-section is obtained. However, by producing the hand by portions with a length L and with a mean diameter D, the ratio L/D of which is less than or equal to 10, or even less than or equal to 5, the risk of vibration of the single-piece part, and therefore the risk of geometrical defects, are avoided.

According to a particular embodiment of the invention, the second portion is selected adjacent to the first portion during the sixth step of the manufacturing method.

According to a particular embodiment of the invention, said manufacturing method comprises additional steps of emissions of modulation of said laser light and of exposure of additional portions, preferably adjacent to one another, to form additional volumes with a circular cross-section, for example cylindrical or conical, with a ratio L/D less than or equal to 10, or even less than or equal to 5, in order to obtain a required hand length.

According to a particular embodiment of the invention, the first portion is selected at a free end of the single-piece part According to a particular embodiment of the invention, at least the first volume with a circular cross-section has a diameter less than the other volumes with a circular cross-section.

According to a particular embodiment of the invention, the volumes with a circular cross-section form a hand with a total length Lt, and with a mean diameter Dt the ratio Lt/Dt of which is greater than or equal to 10, or even greater than or equal to 100.

According to a particular embodiment of the invention, the majority of the portions are machined so that the volumes with a circular cross-section have substantially the same length L.

According to a particular embodiment of the invention, the majority of the portions are machined so that the volumes with a circular cross-section are cylindrical and have substantially the same diameter D.

According to a particular embodiment of the invention, the majority of the portions are machined so that the volumes with a circular cross-section have a decreasing diameter to form a conical hand.

According to a particular embodiment of the invention, the method comprises an additional step preceding the sixth step and/or a step of additional exposure, in which the single-piece part is moved to expose the second portion or the additional portion.

According to a particular embodiment of the invention, the method comprises a prior step in which a hole is pierced in the single-piece part, for example by laser, in particular to be able to insert therein a timepiece-movement rod.

According to a particular embodiment of the invention, a portion intended for the volume with a circular cross-section for the hole with a diameter greater than the other volumes with a circular cross-section is machined in advance.

According to a particular embodiment of the invention, the material comprises, preferably in totality, either a metal such as steel, titanium, brass, aluminium, an amorphous metal, or an alloy of these metals, or composite or metallic ceramic, or glass, sapphire, diamond or ruby.

According to a particular embodiment of the invention, the method comprises an additional step of applying a layer of phosphorescent material on a volume with a circular cross-section, the volume of this circular cross-section preferably having a reduced diameter with respect to the other volumes with a circular cross-section.

The invention also relates to a timepiece hand able to be obtained by the method according to the invention, the hand comprising a body with a circular cross-section, for example cylindrical or conical, in a single piece.

According to particular embodiment of the invention, the timepiece hand comprises a hole.

According to a particular embodiment of the invention, the timepiece hand comprises, preferably in totality, either a metal such as steel, titanium, brass, aluminium, an amorphous metal, or an alloy of these metals, or composite or metallic ceramic, or glass, sapphire, diamond or ruby.

The invention further relates to a timepiece including such a hand.

BRIEF DESCRIPTION OF THE FIGURES

The aims, advantages and features of the present invention will emerge from the reading of several embodiments given solely by way of non-limitative examples, with reference to the accompanying drawings, wherein:

FIGS. 3 to 5 shows schematically a side view of the hand after several steps of the production method according to the invention, FIG. 6 shows schematically a perspective view of a single-piece timepiece hand with a circular cross-section obtained by the method of FIG. 1, and FIG. 7 shows schematically a side view of a single-piece timepiece hand with a circular cross-section obtained by said manufacturing method according to the invention.

DETAILED DESCRIPTION OF THE INVENTION

Figure 1:
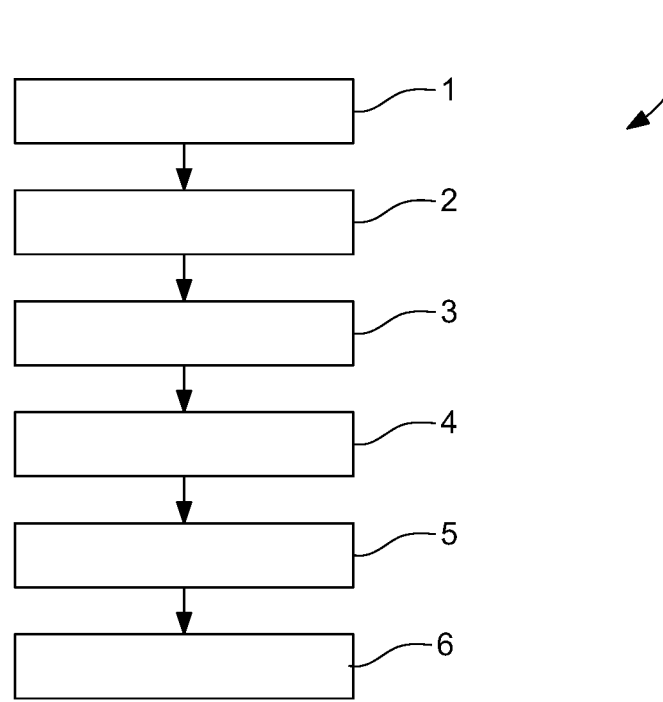
FIG. 1 shows a method for manufacturing a timepiece hand with a single-piece circular cross-section by laser light according to the invention.

The present invention relates to the use of a laser light source to form a single-piece timepiece hand with a circular cross-section. In the embodiment described below, the hand is cylindrical in shape.

According to the invention, said manufacturing method 1, shown on FIGS. 1 to 5, comprises a plurality of steps.

In a first step 1, a single-piece part 7 made from a predefined material is obtained. For example, the predefined material comprises, preferably in totality, either a metal such as steel, titanium, brass, aluminium, an amorphous metal, or an alloy of these metals, or composite or metallic ceramic, or glass, sapphire, diamond or ruby.

The titanium alloy is preferably selected for its lightness. Other materials compatible with laser machining are of course possible.

The single-piece part 7 is preferably elongate along a longitudinal axis 17 with a length at least equal to the length of the required hand. The single-piece part 7 may be in a single piece or already have passed through a step of machining a blank. The single-piece part 7 is preferably solid, i.e. without cavity.

The second step 2 consists in rotating said single-piece part 7 to obtain the required shape with a circular cross-section, here cylindrical. The single-piece part 7 is machined by a laser machining device. The single-piece part 7 is arranged on a rotary turning device 9, which rotates the single-piece part 7 about its longitudinal axis 17 in order to machine it at its periphery.

In a third step 3, a first modulation of said laser light 8, for example in power, and/or in geometry, and/or in time, is emitted, to cut a portion to the required diameter, for example by means of a laser device.

The fourth step 4 consists in exposing a first portion 11 of said at least one single-piece part 7 to said first modulation of said laser light 8 so as to form least a first cylindrical volume 14 with a length $L_1$ and with a mean diameter $D_1$. This is because said laser light is modulated according to certain parameters so that, on exposure of at least a first portion 11 of said single-piece part 7, a first cylindrical volume 14 is formed.

A portion length $L_1$ is selected so that the ratio $$\frac{L_1}{D_1}$$

is less than or equal to 20 or 10, or even less than or equal to 5. With such a ratio, the manufacturing defects that occur when the machining length is too great compared with the diameter of the portion are avoided. This is because, as the laser 8 moves along the portion 11, a portion 11 that is too long compared with the diameter D has a tendency to flex, so that the machining is no longer precise and causes defects.

To machine the single-piece part 7, the latter may furthermore be movable in translation with respect to the laser device, the laser device being immobile. In a variant, the laser device is movable in translation, while the single-piece part 7 is only movable in rotation. The laser device and the single-piece part 7 may also both be movable in translation.

Next, in a fifth step 5, a second modulation of said laser light 8, for example in power, and/or in geometry, and/or in time, is emitted.

In a sixth step 6, at least a second portion 12 of said at least single-piece part 7 is exposed to said second modulation of said laser light 8, so as to form at least a second cylindrical volume 15 with a length $L_2$ and with a mean diameter $D_2$, the ratio $$\frac{L_2}{D_2}$$

being less than or equal to 20, preferably 10, or even less than or equal to 5.

The second portion 12 is adjacent to the first portion 11. In other words, they are consecutive, and oriented around the same longitudinal axis 17. Moreover, it is also possible to configure said second modulation just like said first modulation of the laser light in power and in time.

In this embodiment, it is chosen to make cylindrical volumes with equal lengths, so that $L_1=L_2=L$. In variant embodiments, it is possible to machine the cylindrical volumes with lengths different from each other, provided that a ratio L/D of less than or equal to 20 or 10, or even less than or equal to 5, is kept for each cylindrical volume.

According to the total hand length Lt that it is wished to obtain, additional portions 13 of the single-piece part 7 are exposed, so as to obtain a longer hand 20.

The steps of emission and exposure to a modulation of the laser 8 are repeated several times to obtain a plurality of consecutive adjacent cylindrical volumes 14, 15, 16.

Figure 2:
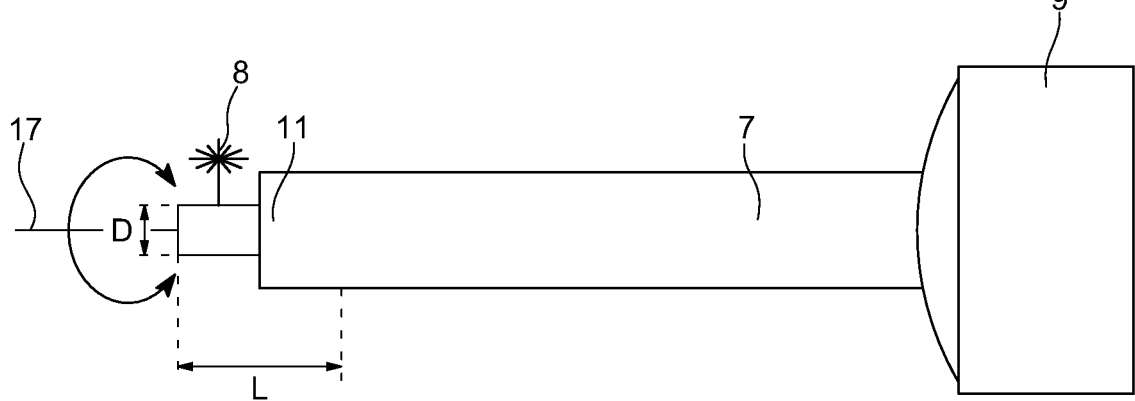
FIG. 2 shows schematically a side view of the machining of a single-piece timepiece hand with a circular cross-section obtained by the method of FIG. 1.
Figure 3:
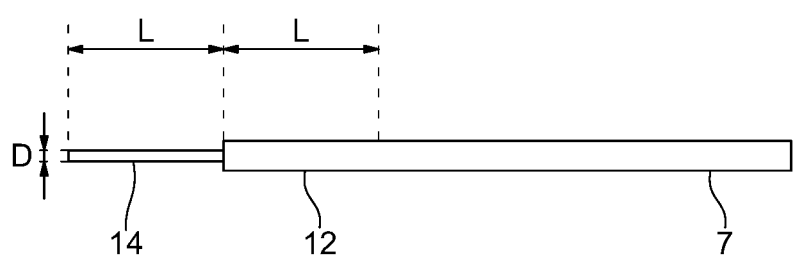

On FIG. 2, the first portion 11 of length L is machined to form a first cylindrical volume 14 of diameter D and of length L at the end of the single-piece part 7, as shown on FIG. 3. Next a second portion 12 of length L is selected, that is adjacent to the first portion 11.

After the laser machining of the second portion 12, a second cylindrical volume 15 is obtained, forming, with the first cylindrical volume 14, the end of the hand, as shown in FIG. 4.

Next a third portion 13 is selected of length L of the single-piece part 7, which is adjacent to the second cylindrical volume 15. The third portion 13 is laser machined to form a third cylindrical volume 16 of mean diameter D and of length L, as shown on FIG. 5.

The hand 20 has for example a length of 15 to 20 mm, and a mean diameter of 0.2 mm to 0.5 mm at one end and of 0.3 mm to 0.6 mm at the other end.

The laser machining steps are repeated on additional adjacent portions until the required total length Lt is obtained for the hand 20. Thus, the hand 20 comprises a single-piece cylindrical body.

Preferably, the cylindrical volumes 14, 15, 16 obtained have substantially the same diameter D, so that the hand 20 has a substantially equal diameter over its entire length Lt.

The consecutive cylindrical volumes 14, 15, 16 form a hand 20 with a total length Lt, the ratio Lt/D of which is preferably greater than or equal to 10, or even greater than or equal to 100.

The method may furthermore comprise a subsequent step of surface finishing on the adjacent volumes 14, 15, 16 to guarantee that the form and the finish are substantially continuous. This step may be implemented by laser with softer parameters to produce a surface with low roughness and to make the interface between two treated consecutive volumes disappear.

The method may furthermore comprise a step of piercing a hole 21 to be able to insert a rod, the piercing step being able to be implemented before or after the laser machining.

The hole is preferably produced in advance through a portion of the single-piece part 7, i.e. before the machining of the cylindrical volume 24 including the hole 21. Thus, the hand 20 in FIGS. 6 and 7 has a hole 21 for inserting therein the rod of a timepiece movement. By piercing the hole 21 before the laser machining, it is avoided doing it in the hand, which is too thin. The single-piece part (7) being wider, it is easier to hold it for piercing the hole 21.

Preferably, at least a part of the cylindrical volume 24 comprising the hole 21 has a diameter greater than the other cylindrical volumes, in particular so that the hole 21 is fairly deep to accommodate the rod and so that the cylindrical volume 24 is sufficiently strong. The hole 21 can be pierced by various machining techniques, in particular by laser.

In a particular variant embodiment, shown on FIGS. 6 and 7, at least one cylindrical volume 22 of the end of the hand 20 has a reduced diameter. The reduction in the diameter makes it possible to deposit a layer of phosphorescent material 23 on the reduced cylindrical volume. This makes it possible for example to obtain an end of the hand 20 with the same diameter as the other cylindrical volumes 22. For this purpose, a diameter of the cylindrical volume 22 is selected reduced by the thickness of the layer of phosphorescent material 23 applied subsequently.

One of the advantages of this method is the manufacture of a single-piece cylindrical timepiece hand 20 that is more rigid than a flat hand and that furthermore provides a particular aesthetic effect for the hand 20.

In addition, the hand 20 furthermore having a hole 21 formed directly in the single-piece hand 20, it is avoided attaching an additional part provided with a barrel and which must be assembled on the hand 20 to be able to hold the hand 20 on a rod of the timepiece movement. Thus, the difficulties in assembling are reduced, as well as the risk of disassembly.

Naturally the invention is not limited to the embodiment described with reference to the figures and variants can be envisaged without departing from the scope of the invention. Thus the method can be used for forming a hand with a conical shape, by forming conical portions the diameters of which decrease following one another. It is also possible to form a hand the diameter of which varies with different volumes provided that they have a circular cross-section.

The invention claimed is:

1. A method for manufacturing a single-piece timepiece hand by laser light, comprising:
    a first step of obtaining a single-piece part made from predefined material, the part extending along a longitudinal axis;
    a second step of rotating said single-piece part:
    a third step of emitting a first modulation of said laser light;
    a fourth step of exposing a first portion of said single-piece part to said first modulation of said laser light so as to form least a first volume with a circular cross-section, with a length $L_1$ and with a mean diameter $D_1$, the ratio $$\frac{L_1}{D_1}$$

being less than or equal to 20;

a fifth step of emitting a second modulation of said laser light; and a sixth step of exposing a second portion of said single-piece part to said second modulation of said laser light so as to form least a second volume with a circular cross-section, with a length $L_2$ and with a mean diameter $D_2$, the ratio $$\frac{L_2}{D_2}$$

being less than or equal to 20.

2. The manufacturing method according to claim 1, wherein the second portion is selected adjacent to the first portion during the sixth step.

3. The manufacturing method according to claim 1, comprising additional steps of emissions of modulation of said laser light and of exposure of additional portions, to form additional volumes with a circular cross-section, with a ratio L/D less than or equal to 20, in order to obtain a required hand length.

4. The manufacturing method according to claim 1, wherein the first portion is selected at a free end of the single-piece part.

5. The manufacturing method according to claim 1, wherein at least the first volume with a circular cross-section has a diameter less than the other volumes with a circular cross-section.

6. The manufacturing method according to claim 1, wherein the volumes with a circular cross-section form a hand with a total length Lt and with a mean diameter Dt the ratio Lt/Dt of which is greater than or equal to 10.

7. The manufacturing method according to claim 1, wherein the majority of the portions are machined so that the volumes with a circular cross-section have substantially the same length L.

8. The manufacturing method according to claim 1, wherein the majority of the portions are machined so that the volumes with a circular cross-section have substantially the same diameter D.

9. The manufacturing method according to claim 1, wherein the majority of the portions are machined so that the volumes with a circular cross-section have a decreasing diameter to form a conical hand.

10. The manufacturing method according to claim 1, comprising an additional step preceding the sixth step and/or a step of additional exposure, in which the single-piece part is moved to expose the second portion or the additional portion.

11. The manufacturing method according to claim 1, comprising a prior step in which a hole is pierced in the single-piece part to be able to insert therein a timepiece-movement rod.

12. The manufacturing method according to claim 11, wherein the portion of the single-piece part is machined provided with the hole with a diameter greater than the other volumes with a circular cross-section.

13. The manufacturing method according to claim 1, wherein the material comprises either a metal such as steel, titanium, brass, aluminium, an amorphous metal, or an alloy of these metals, or composite or metallic ceramic, or glass, sapphire, diamond or ruby.

14. The manufacturing method according to claim 1, comprising an additional step of applying a layer of phosphorescent material on a volume with a circular cross-section, the volume with a circular cross-section having a reduced diameter.

* * * * *